United States Patent [19]
Jibe et al.

[11] Patent Number: 5,939,674
[45] Date of Patent: Aug. 17, 1999

[54] WATERPROOF STRUCTURE FOR WIRE LEADING PART AND MANUFACTURING METHOD THEREOF

[75] Inventors: Tetsuo Jibe; Akira Shinchi, both of Shizuoka-ken, Japan

[73] Assignee: Yazaki Corporation, Tokyo, Japan

[21] Appl. No.: 08/996,400

[22] Filed: Dec. 22, 1997

[30] Foreign Application Priority Data

Dec. 26, 1996 [JP] Japan .................................. 8-348245

[51] Int. Cl.$^6$ ................................................ H01R 13/504
[52] U.S. Cl. ...................... 174/59; 174/65 G; 174/152 G
[58] Field of Search ............................ 174/59, 60, 50.62, 174/65 G, 152 G, 153 G, 151, 135; 248/56; 16/2.1, 2.2

[56] References Cited

U.S. PATENT DOCUMENTS

| | | | |
|---|---|---|---|
| 2,227,528 | 1/1941 | Adler | 174/135 |
| 3,282,544 | 11/1966 | Brattberg | 248/56 |
| 3,523,156 | 8/1970 | Phillips, Jr. | 174/65 G X |
| 3,676,744 | 7/1972 | Pennypacker | 174/59 X |
| 4,215,236 | 7/1980 | Reiser | 174/59 |
| 5,234,185 | 8/1993 | Hoffman et al. | 248/56 |

FOREIGN PATENT DOCUMENTS

| | | | |
|---|---|---|---|
| 0048930 A1 | 9/1981 | European Pat. Off. | |
| 50-54591 | 5/1975 | Japan | |
| 5-57772 | 7/1993 | Japan | |

*Primary Examiner*—Dean A. Reichard
*Attorney, Agent, or Firm*—Finnegan, Henderson, Farabow, Garrett & Dunner, L.L.P.

[57] ABSTRACT

A waterproof structure for an electrical wiring instrument includes electrical wires, a housing, an upper cover and rubbery elastic members resulting from a pair of rubbery elastic materials. The housing has a cover portion formed on an end of the housing and provided with first accommodation grooves for accommodating the electrical wires. Each of the first accommodation grooves is defined by a pair of first ribs parallel to each other. The upper cover has second accommodation grooves formed for accommodating the electrical wires. Each of the second accommodation grooves is defined by a pair of second ribs parallel to each other. In assembling, after accommodating the wires in the first accommodation grooves, the wires are interposed between the pair of rubbery elastic materials in the form of sheets. Then, the upper cover is laid on the cover portion and subsequently subjected to ultrasonic oscillation under pressure. Consequently, the pair of rubbery elastic materials are cut by the first and second ribs to produce the elastic members surrounding the wires in accommodation holes defined by the first and second accommodation grooves.

8 Claims, 4 Drawing Sheets

FIG.1
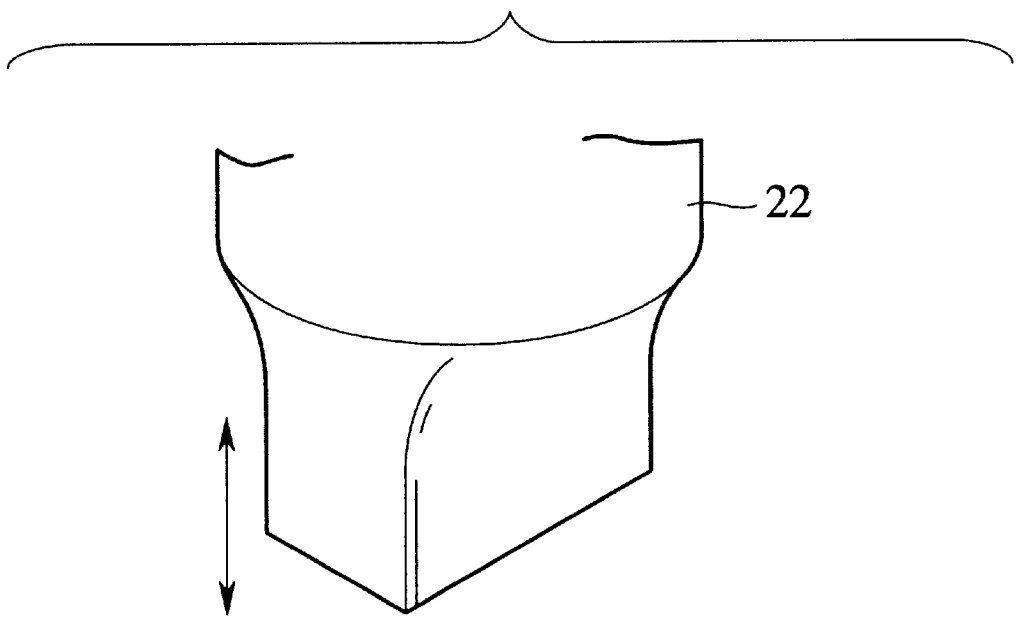
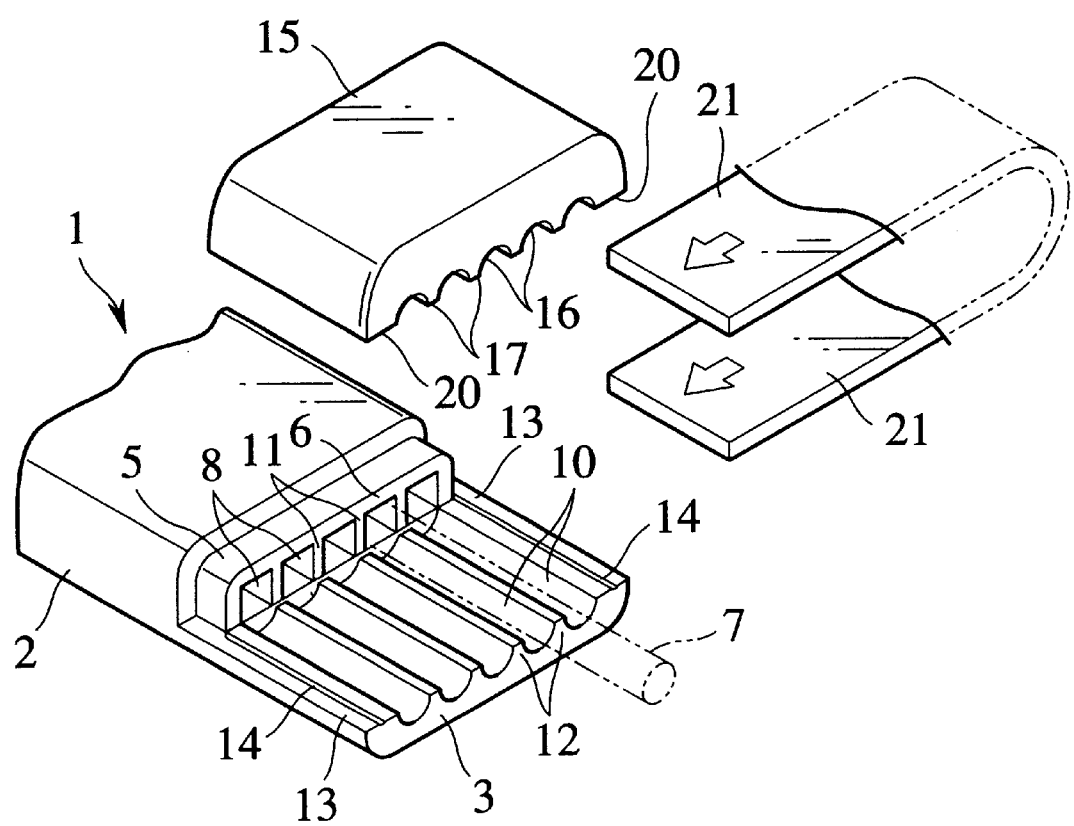

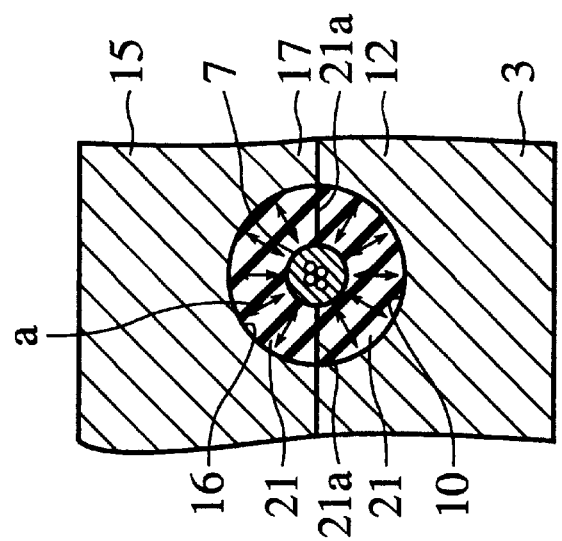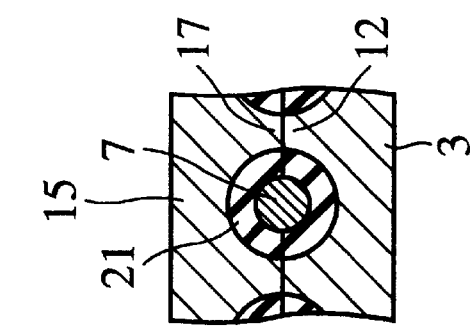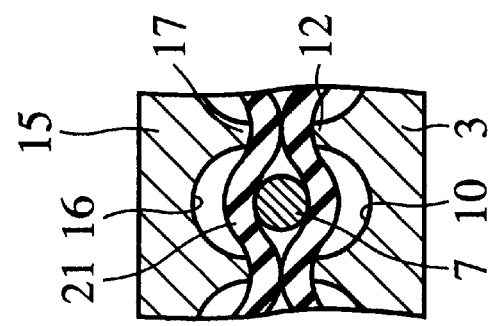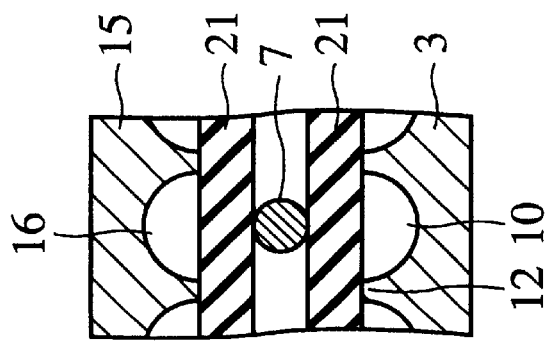

WATERPROOF STRUCTURE FOR WIRE LEADING PART AND MANUFACTURING METHOD THEREOF

BACKGROUND OF THE INVENTION

The present invention relates to a waterproof structure for a wire part and a method of manufacturing the structure. In detail, it relates to a waterproof structure for waterproofing a wire leading part in a wiring instrument (e.g. a Waterproof connector, an electrical connection box etc.) by a rubbery elastic member and a method of manufacturing the waterproof structure.

For example, Japanese Unexamined Utility Model Publication (Kokai) No. 50-54591 discloses a conventional art waterproof structure where a plurality of covered wires are interposed between an upper half rubber plug and a lower half rubber plug, so that the resulting plug assembly is press-fitted into a recess formed on a connector housing.

In the above-mentioned conventional waterproof structure, however, there are problems to be solved despite that the plural wires can be waterproofed collectively. That is, it is troublesome for a worker to fit the rubber plug assembly into the connector housing and the manufacturing cost is increased due to the necessity of establishing different molding dies for the upper and lower rubber plugs in accordance with the size of wires and the number of poles.

In addition, Japanese Unexamined Utility Model Publication (Kokai) No. 5-57772 discloses another conventional waterproof structure where a pair of packing holders are slidably attached to a connector housing, so that a pair of packings can be pressed against wires from the upper and bottom sides by manipulating the packing holders.

Although this waterproof structure facilitates a sealing operation with the packings relatively and copes with the differences in sizes of wires and numbers of poles to a certain extent, it is unavoidable that a clearance between the pair of packings is produced by the side of the wire. Therefore, the above structure has a disadvantage of lowered waterproof performance.

SUMMARY OF THE INVENTION

It is therefore an object of the present invention to provide a waterproof structure for a wire leading part, which exhibits high waterproof capability in spite of low manufacturing cost and a method of manufacturing such a waterproof structure.

The object of the present invention described above can be accomplished by a waterproof structure for an electrical wiring instrument, comprising:

an electrical wire;

a housing provided with a wire leading part through which the electrical wire is drawn out and which includes a cover portion disposed on an end of the housing to have a first accommodation groove for accommodating the electrical wire, the first accommodation groove being defined by a pair of first ribs parallel to each other;

an upper cover arranged on the cover portion of the housing and welded to the cover portion by ultrasonic oscillation, the upper cover also having a second accommodation groove defined by a pair of second ribs parallel to each other, the second ribs being respectively welded to the first ribs by the ultrasonic oscillation; and a rubbery elastic member accommodated in an accommodation hole under compression, the accommodation hole being defined by the first and second accommodation grooves, the rubbery elastic member originating from two sheets of rubbery elastic materials which are arranged so as to interpose the electrical wire therebetween and which are cut off by the first and second ribs during the ultrasonic oscillation;

wherein the electrical wire is arranged so as to penetrate the rubbery elastic member at a substantial center thereof.

With the arrangement of the invention, since the rubbery elastic member is compressed by the cover portion and the upper cover, the rubbery elastic member comes into tight contact with the periphery of the electrical wire and the first and second accommodation grooves with no clearance. Thus, it is possible to accomplish high waterproof performance.

In the present invention mentioned above, preferably, the cover portion of the housing is provided, on both lateral edges thereof, with a pair of sharp-pointed ribs parallel to each other.

In such a case, owing to the provision of the sharp-pointed ribs on the cover portion, it is possible to progress the integration of the cover portion with the upper cover by the ultrasonic oscillation.

More preferably, the cover portion and the upper cover are respectively provided with accommodation recesses in which the first and second ribs are eliminated and which accommodate the rubbery elastic member in the form of a flattened block where the rubbery elastic materials are integrated tightly.

In this case, owing to the formation of the block accommodated in the accommodation recesses, it is possible to prevent the rubbery elastic member from slipping from the housing.

Similarly, the object of the present invention described above can be also accomplished by a waterproof structure for an electrical wiring instrument, comprising:

a plurality of electrical wire;

a housing provided with a wire leading part through which the electrical wires are drawn out and which includes a cover portion disposed on an end of the housing to have a plurality of first accommodation grooves for accommodating the electrical wires respectively, each of the first accommodation grooves being defined by a pair of first ribs parallel to each other;

an upper cover arranged on the cover portion of the housing and welded to the cover portion by ultrasonic oscillation, the upper cover also having a plurality of second accommodation grooves each of which is defined by a pair of second ribs parallel to each other, the second ribs being respectively welded to the first ribs by the ultrasonic oscillation; and a plurality of rubbery elastic members accommodated in a plurality of accommodation holes under compression, each of the accommodation holes being defined by the first and second accommodation grooves, the rubbery elastic members originating from two sheets of rubbery elastic materials which are arranged so as to interpose the electrical wires therebetween and which are cut off by the first ribs and said second ribs during the ultrasonic oscillation in order to provide the rubbery elastic members;

wherein the electrical wires are arranged so as to penetrate the rubbery elastic members at substantial centers thereof, respectively.

With the arrangement of the invention, since the rubbery elastic members are discontinuously formed in the wire leading part by the first and second ribs and compressed by the cover portion and the upper cover, the rubbery elastic members come into tight contact with the peripheries of the electrical wires and the first and second accommodation grooves with no clearance, whereby the high waterproof performance can be effected.

According to the invention, there is also provided a method of manufacturing a waterproof structure for a wire leading part of a housing, the method comprising the steps of:

drawing an electrical wire out of the housing and subsequently setting the electrical wire in a first accommodation groove defined by a pair of first ribs parallel to each other, the first ribs being formed in a cover portion disposed on an end of the housing;

interposing the electrical wire between two sheets of rubbery elastic materials from upside and downside of the electrical wire;

disposing an upper cover, which has a second accommodation groove defined by a pair of second ribs parallel to each other, on the rubbery elastic materials in a manner that the second ribs respectively oppose the first ribs through the rubbery elastic materials; and butting an ultrasonic horn against the upper cover and exerting a load thereon while oscillating ultrasonic waves thereby to cut off the rubbery elastic materials between the first ribs of the cover portion and the second ribs of the upper cover and weld the first and second ribs to each other simultaneously.

According to the present method, since the ultrasonic waves are oscillated by the ultrasonic horn under condition of interposing the rubbery elastic materials between the cover portion and the upper cover, the compressing of the elastic materials, the cutting of the materials between the first and second ribs, and the fusing of the first and second ribs can be finished at one process simultaneously, so that the manufacturing work can be simplified. In addition, since the resulting elastic member is compressed in the accommodation grooves strongly and both of the cover portion and the cover are firmly integrated by the mutual fusing of the first and second ribs, it is possible to provide the waterproof structure of the wire leading part with high reliability.

Further, according to the invention, there is also provided a method of manufacturing a waterproof structure for a wire leading part of a housing, the method comprising the steps of:

drawing a plurality of electrical wires out of the housing and subsequently setting the electrical wires in a plurality of first accommodation grooves defined by a plurality of first ribs parallel to each other, the first ribs being formed in a cover portion disposed on an end of the housing;

interposing the electrical wires between two sheets of rubbery elastic materials from upside and downside of the electrical wires;

disposing an upper cover, which has a plurality of second accommodation grooves defined by a plurality of second ribs parallel to each other, on the rubbery elastic materials in a manner that the second ribs respectively oppose the first ribs through the rubbery elastic materials; and butting an ultrasonic horn against the upper cover and exerting a load thereon while oscillating ultrasonic waves thereby to cut off the rubbery elastic materials between the first ribs of the cover portion and the second ribs of the upper cover and weld the first and second ribs to each other simultaneously.

Also in this case, operation and effects similar to those of the previously mentioned method are realized.

These and other objects and features of the present invention will become more fully apparent from the following description and appended claims taken in conjunction with the accompany drawing.

BRIEF DESCRIPTION OF THE DRAWINGS

FIG. 1 is a perspective view showing a manufacturing method of the waterproof structure in accordance with a first embodiment of the present invention;

FIGS. 2A, 2B and 2C are cross sectional views of essential parts, respectively showing manufacturing processes, in accordance with the first embodiment of the invention, FIG. 2D is an enlarged cross sectional view of an essential part of an end product of the first embodiment;

DESCRIPTION OF THE PREFERRED EMBODIMENT

Figure 3:
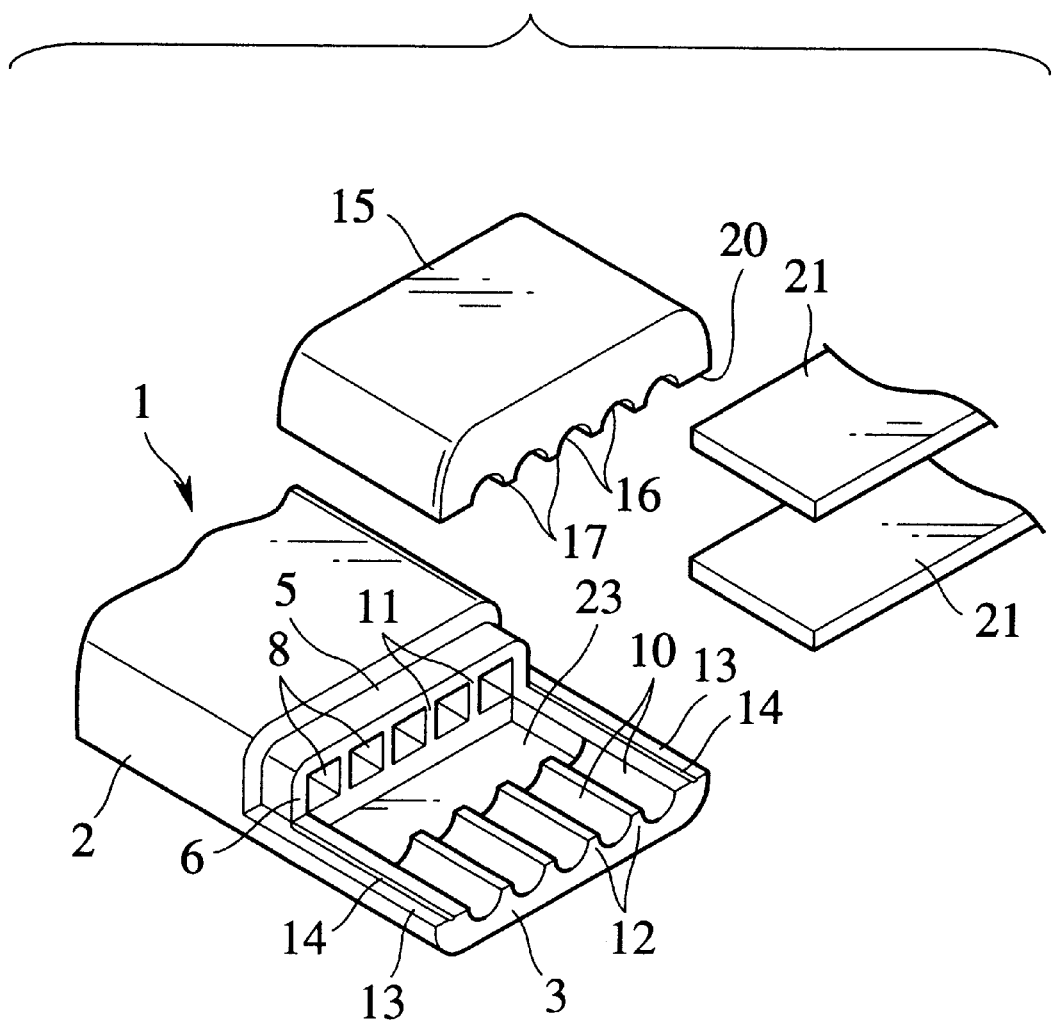
FIG. 3 is a perspective view showing a manufacturing method of the waterproof structure, in accordance with a second embodiment of the present invention.

Embodiments of the present invention will be described with reference to the drawings.

FIGS. 1 and 2 show a waterproof structure of a wire leading part, in accordance with the first embodiment of the present invention, also showing an application to a wire leading part of a connector.

Being made of plastic material as a whole, the connector 1 comprises an oblong housing 2 and a cover portion 3 integrally formed at an end of the housing 2. The cover portion 3 includes a step 5 formed on a base part of the portion 3. The step 5 is provided, on a front face 6 thereof, with a plurality of holes 8 through which wires 7 (only one shown with two-dot chain line in FIG. 1) passing through the housing 2 are drawn out of the connector 1.

On an upper face of the cover portion 3, semi-circular accommodation grooves 10 are formed so as to direct upward, corresponding to the holes 8, respectively. The semi-circular accommodation grooves 10 are defined by ribs 12 corresponding to partition walls 11 defining the respective holes 8. Further, a pair of sharp-pointed ribs 14, 14 are formed on both lateral edges 13, 13 of the cover portion 3.

An upper cover 15 is provided with semi-circular accommodation grooves 16 directing downward and respectively corresponding to the grooves 10 of the cover portion 3, downward ribs 17 respectively corresponding to the ribs 12, and both edges 20, 20 respectively corresponding to the lateral edges 13, 13.

According to the embodiment, the ribs 12, 17 are formed so as to be as sharp-pointed as possible in the molding technique. Owing to this formation, it is possible to improve the ribs 12, 17 function to cut rubbery elastic materials described later.

We now describe a manufacturing process of the waterproof structure of the wire leading part of the first embodiment with reference to FIG. 2.

The manufacturing process comprises the following steps of:

(1) drawing the wires 7 out of the holes 8 along the semi-circular accommodating grooves 10 while engaging terminals (not shown) connected to the wires 7 in the housing 2;

(2) setting two sheets of rubbery elastic materials 21, 21 on the cover portion 3 so that the wires 7 are interposed between the materials 21, 21;

[Note: the parallel materials 21, 21 may be provided by bending a sheet of elastic material, as shown with two-dot chain line of FIG. 1. As to the rubbery elastic materials 21, 21, it is not limited to any specified material so far as it is any one of natural rubber, synthetic rubber and elastomer having rubbery (resilient) elasticity. The order of the above steps (1) and (2) may be reversed, of course.]

(3) putting the upper cover 15 on the rubbery elastic materials 21, 21 (strictly speaking, the upper one of the materials) as shown in FIG. 2; and (4) lowering an ultrasonic horn 22 and subsequently oscillating ultrasonic waves while exerting a load on the upper cover 15, as shown in FIG. 2B. Consequently, the rubbery elastic materials 21, 21 are cut under pressure by the ribs 12, 17 and the projecting ribs 14 and simultaneously, the ribs 12 of the cover portion 3 and the ribs 17 of the upper cover 15 are fused in each other. In addition, due to the melting of the ribs 14, both edges 13, 20 are fused and welded to each other. Generally speaking, it is impossible to weld such rubbery elastic members to each other by the ultrasonic oscillation because they usually absorb the ultrasonic waves. However, it should be noted that such a rubbery member has a nature that to compress the member to a certain extent so as not to absorb the ultrasonic oscillation allows the member to be heated and cut finally. Accordingly, when the load by the ultrasonic horn 22 exceeds the certain extent, the rubbery elastic materials 21, 21 are cut off.

Consequently, as shown in FIG. 2C, the rubbery elastic materials 21, 21 are compressed and independently accommodated in a round accommodation hole defined by the upper and lower semi-circular accommodation grooves 10, 16, while the wire 7 penetrates the accommodated elastic materials 21, 21 at a substantial center thereof. Under such a positioning of the wire 7 in the accommodation hole, uniform pressure is applied on the whole periphery of the wire 7. Therefore, no clearance can be produced about the wire 7, thereby accomplishing a perfect waterproof structure.

Such a condition is shown in FIG. 2D. That is, in the round accommodation hole defined by the upper and lower accommodation grooves 10, 16, respective end faces 21a, 21a of the upper material 21 tightly confront the end faces 21a, 21a of the lower material 21 respectively, thereby providing integrated materials as if it were a single rubbery elastic member. Note, in the specification, the resultant elastic member is represented by reference numeral 21, too. Under such a condition, since recovering forces ( shown with letter a in FIG. 2D) are produced uniformly along the circumferential direction of the member 21, it comes into tight contact with the outer surface of the wire 7 and the accommodation grooves 10, 16

As mentioned above, according to the embodiment, since the rubbery elastic materials 21, 21 are cut off by the ribs 12, 17 discontinuously and also compressed by the cover portion 3 and the cover 15 strongly, the resultant elastic member 21 has a close contact with the periphery of the wire 7 and the accommodation grooves 10, 16 with no clearance, whereby high waterproof performance can be effected.

Further, since the elastic member 21 of the embodiment is constituted by materials in the form of a sheet, there is no need of processing a raw material with dies etc., whereby it is possible to use one kind of sheet material in common, irrespective of the size and number of wires.

Again, according to the manufacturing method of the invention, since the ultrasonic waves are oscillated by the ultrasonic horn 22 while interposing the sheet-shaped rubbery elastic materials 21, 21 between the cover portion 3 and the cover 15, the compressing of the materials 21, 21, the cutting of the materials 21, 21 between the ribs 12, 17, and the fusing of the ribs 12, 17 can be finished at one process simultaneously, so that the manufacturing work can be simplified. In addition, since the resultant elastic member 21 is compressed in the accommodation grooves 10, 16 strongly and both of the cover portion 3 and the cover 15 are firmly integrated by the mutual fusing of the ribs 12, 17, it is possible to provide the waterproof structure of the wire leading part with high reliability.

Figure 4:
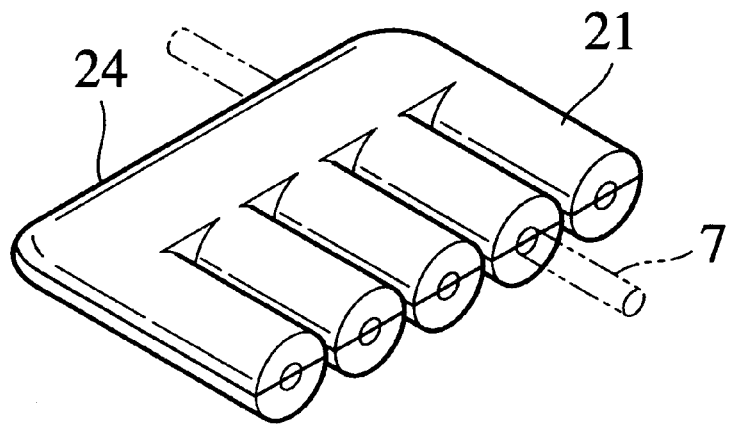
FIG. 4 is a perspective view of a rubber elastic body of the waterproof structure of the second embodiment, eliminating a cover.
Figure 5:
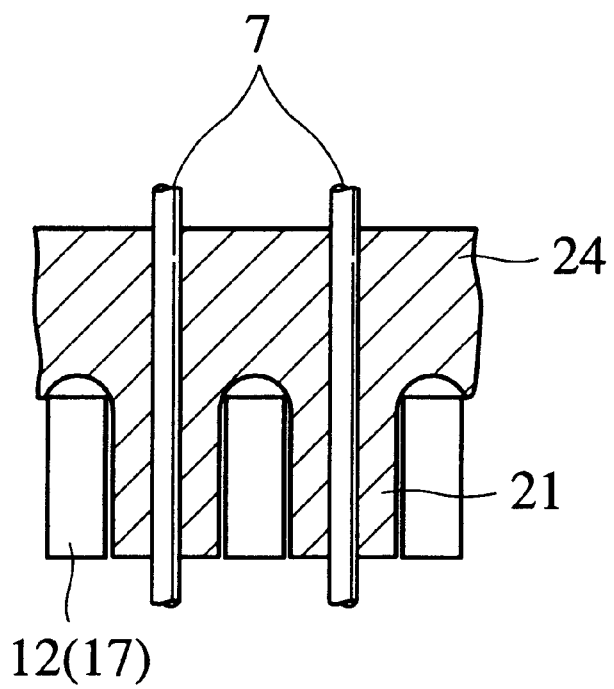
FIG. 5 is a horizontal cross sectional view of a part of the elastic body of FIG. 4.

FIGS. 3 to 5 shows the second embodiment of the invention. Note, in this embodiment, elements similar to those of the first embodiment are indicated with like reference numerals, respectively.

According to the embodiment, respective rear portions of the ribs 12 are eliminated to define an accommodation recess 23 adjacent to the front face 6 on the step 5 of the housing 2. Though it is not shown in the figure, a similar accommodation recess is formed behind the ribs 17 of the cover 15.

In this embodiment, when fusing the upper cover 15 in the cover portion 3 by the ultrasonic horn 22 as mentioned above, the rubbery elastic materials 21, 21 are compressed between the upper and lower accommodation recesses 23, so that a block portion 24 is produced (see FIG. 4). In operation, since the block portion 24 is caught by the ribs 12, 17 as shown in FIG. 5, it is possible to prevent the elastic member 21 from slipping out of the cover portion 3 and the upper cover 15.

Note, in the modification of the accommodation recess 23, it may be constituted by eliminating intermediate portions of the ribs 12, 17 partially.

In this way, even if a force to draw the member 21 out of the accommodation grooves 10, 16 is exerted on the member 2, it is possible to cope with the drawing owing to the engagement of the ribs 12, 17 with the block portion 24, thereby increasing the structure's strength against the drawing.

Finally, although the present waterproof structures and waterproof method of the embodiments are applied to the electrical connectors in common, it will be understood by those skilled in the art that the present invention is applicable to all of wiring instruments having an electrical connection box and the other wire leading part. In addition, although the waterproof structures of the embodiments are constructed so as to accommodate the plural of wires, the present invention is applicable to a connector constructed so as to accommodate a single wire, of course. In such a case, a housing of the connector is provided, on an end thereof, with a single accommodation groove defined by a pair of ribs, for accommodating the wire.

What is claimed is:

1. A waterproof structure for an electrical wiring instrument, comprising:

an electrical wire;

a housing provided with a wire leading part through which said electrical wire is drawn out and which includes a cover portion disposed on an end of said housing to have a first accommodation groove for accommodating said electrical wire, said first accommodation groove being defined by a pair of first ribs parallel to each other;

an upper cover arranged on said cover portion of said housing and welded to said cover portion by ultrasonic oscillation, said upper cover also having a second accommodation groove defined by a pair of second ribs parallel to each other, said second ribs being respectively welded to said first ribs by the ultrasonic oscillation; and a rubbery elastic member accommodated in an accommodation hole under compression, said accommodation hole being defined by said first and second accommodation grooves, said rubbery elastic member originating from two sheets of rubbery elastic materials which are arranged so as to interpose said electrical wire therebetween and which are cut off by said first and second ribs during the ultrasonic oscillation;

wherein said electrical wire is arranged so as to penetrate said rubbery elastic member at a substantial center thereof.

2. A waterproof structure as claimed in claim 1, wherein said cover portion of said housing is provided, on both lateral edges thereof, with a pair of sharp-pointed ribs parallel to each other.

3. A waterproof structure as claimed in claim 1 or 2, wherein said cover portion and said upper cover are respectively provided with accommodation recesses in which said first and second ribs are eliminated and which accommodate said rubbery elastic member in the form of a flattened block where said rubbery elastic materials are integrated tightly.

4. A waterproof structure for an electrical wiring instrument, comprising:

a plurality of electrical wires;

a housing provided with a wire leading part through which said electrical wires are drawn out and which includes a cover portion disposed on an end of said housing to have a plurality of first accommodation grooves for accommodating said electrical wires respectively, each of said first accommodation grooves being defined by a pair of first ribs parallel to each other;

an upper cover arranged on said cover portion of said housing and welded to said cover portion by ultrasonic oscillation, said upper cover also having a plurality of second accommodation grooves each of which is defined by a pair of second ribs parallel to each other, said second ribs being respectively welded to said first ribs by the ultrasonic oscillation; and a plurality of rubbery elastic members accommodated in a plurality of accommodation holes under compression, each of said accommodation holes being defined by said first and second accommodation grooves, each of said rubbery elastic members originating from two sheets of rubbery elastic materials which are arranged so as to interpose said electrical wires therebetween and which are cut off by said first ribs and said second ribs during the ultrasonic oscillation in order to provide said rubbery elastic members;

wherein said electrical wires are arranged so as to penetrate said rubbery elastic members at substantial centers thereof, respectively.

5. A waterproof structure as claimed in claim 4, wherein said cover portion of said housing is provided, on both lateral edges thereof, with a pair of sharp-pointed ribs parallel to each other.

6. A waterproof structure as claimed in claim 4 or 5, wherein said cover portion and said upper cover are respectively provided with accommodation recesses in which said first and second ribs are eliminated and which accommodate said rubbery elastic members in the form of a flattened and integrated block where said rubbery elastic members are integrated tightly.

7. A method of manufacturing a waterproof structure for a wire leading part of a housing, said method comprising the steps of:

drawing an electrical wire out of said housing and subsequently setting said electrical wire in a first accommodation groove defined by a pair of first ribs parallel to each other, said first ribs being formed in a cover portion disposed on an end of said housing;

interposing said electrical wire between two sheets of rubbery elastic materials from upside and downside of said electrical wire;

disposing an upper cover, which has a second accommodation groove defined by a pair of second ribs parallel to each other, on said rubbery elastic materials in a manner such that said second ribs respectively oppose said first ribs through said rubbery elastic materials; and butting an ultrasonic horn against said upper cover and exerting a load thereon while oscillating ultrasonic waves thereby to cut off said rubbery elastic materials between said first ribs of said cover portion and said second ribs of said upper cover and weld said first and second ribs to each other simultaneously.

8. A method of manufacturing a waterproof structure for a wire leading part of a housing, said method comprising the steps of:

drawing a plurality of electrical wires out of said housing and subsequently setting said electrical wires in a plurality of first accommodation grooves defined by a plurality of first ribs parallel to each other, said first ribs being formed in a cover portion disposed on an end of said housing;

interposing said electrical wires between two sheets of rubbery elastic materials from upside and downside of said electrical wires;

disposing an upper cover, which has a plurality of second accommodation grooves defined by a plurality of second ribs parallel to each other, on said rubbery elastic materials in a manner that said second ribs respectively oppose said first ribs through said rubbery elastic materials; and butting an ultrasonic horn against said upper cover and exerting a load thereon while oscillating ultrasonic waves thereby to cut off said rubbery elastic materials between said first ribs of said cover portion and said second ribs of said upper cover and weld said first and second ribs to each other simultaneously.

\* \* \* \* \*